(12) United States Patent
Koenigstein et al.

(10) Patent No.: US 8,176,091 B2
(45) Date of Patent: May 8, 2012

(54) METHOD, A SYSTEM AND A COMPUTER PROGRAM PRODUCT FOR DETECTING A LOCAL PHENOMENON

(75) Inventors: Noam Koenigstein, Ra'anana (IL);
Yuval Shavitt, Ra'anana (IL); Tomer Tankel, Ra'anana (IL)

(73) Assignee: Ramot At Tel Aviv University Ltd., Tel Aviv (IL)

( * ) Notice: Subject to any disclaimer, the term of this patent is extended or adjusted under 35 U.S.C. 154(b) by 400 days.

(21) Appl. No.: 12/436,840

(22) Filed: May 7, 2009

(65) Prior Publication Data

US 2009/0282029 A1    Nov. 12, 2009

Related U.S. Application Data

(60) Provisional application No. 61/051,016, filed on May 7, 2008.

(51) Int. Cl.
*G06F 7/00* (2006.01)
*G06F 17/30* (2006.01)

(52) U.S. Cl. ........ 707/802; 707/803; 707/944; 707/953; 707/954

(58) Field of Classification Search .......... 707/790, 707/802, 803, 944, 953, 954, 999.1, 999.102
See application file for complete search history.

(56) References Cited

U.S. PATENT DOCUMENTS

| | | | |
|---|---|---|---|
| 7,599,919 B2 * | 10/2009 | Oguri et al. | 707/999.003 |
| 2002/0049700 A1 * | 4/2002 | Couch et al. | 707/1 |
| 2005/0004934 A1 * | 1/2005 | Elsey et al. | 707/102 |
| 2005/0198020 A1 * | 9/2005 | Garland et al. | 707/3 |
| 2008/0071542 A1 * | 3/2008 | Yu | 704/270 |
| 2008/0288494 A1 * | 11/2008 | Brogger et al. | 707/7 |
| 2009/0160859 A1 * | 6/2009 | Horowitz et al. | 345/440 |
| 2009/0271368 A1 * | 10/2009 | Channell | 707/3 |
| 2010/0191582 A1 * | 7/2010 | Dicker et al. | 705/10 |

* cited by examiner

*Primary Examiner* — Hares Jami
(74) *Attorney, Agent, or Firm* — Reches Patents (57) ABSTRACT

A system for detecting a local phenomenon, the system includes an interface for receiving queries information from a system for retrieving art related media, and a processor, configured to: (a) create a first local popularity chart, wherein the creating of the first local popularity chart includes enumerating, for each geographic area of a group of sampled geographic areas, identical query strings of queries that are included in a group of queries; (b) create a first global popularity chart, wherein the creating of the first global popularity chart includes enumerating identical query strings of the queries that are included in the group of queries; and (c) select at least one query string in response to a scoring of the query string at the first local popularity chart and to a scoring of the query string at the first global popularity chart; wherein the group of queries includes queries which were queried during a first period of time.

20 Claims, 7 Drawing Sheets

| 660 selecting at least one query string in response to a scoring of the query string at the local popularity chart and to a scoring of the query string at the global popularity chart |
|---|
| 661 selecting at least one query string that is associated with the artist to which a local phenomenon that is detectable by the method pertains |
| 662 selecting the at least one query string in response to at least one comparison of a scoring of the query string at either of the local and the global popularity charts to a popularity threshold associated with that popularity chart |
| 663 selecting query strings for which the local scoring in a geographic area is higher than the local popularity threshold |
| 664 selecting query strings for which the global scoring is lower than the global popularity threshold |
| 665 selecting query strings for which a local scoring (in one of the geographic areas) is higher than the global scoring |

| 670 comparing, for at least one of the selected query strings, a scoring of the selected query string to a scoring of the selected query string that is responsive to queries which were queried during at least one second period of time that preceded the first period of time |
|---|

| 681 manufacturing multiple machine readable mediums, each of which stores a reproduction of media created by the artist | 682 printing the selected query string | 683 providing a list of at least one query string with high probability to belong to at least one emerging artist |
|---|---|---|

(a) Madonna (b) Yung Berg (c) Soulja Boy (d) Mistah F.A.B

FIG. 6

METHOD, A SYSTEM AND A COMPUTER PROGRAM PRODUCT FOR DETECTING A LOCAL PHENOMENON

CROSS REFERENCE TO RELATED APPLICATIONS

This application claims the benefit of U.S. Provisional Patent Application No. 61/051,016, filed on May 7, 2008, entitled "A method, A System and A Computer Program Product for Detecting Emerging Artists", which is incorporated in its entirety herein by reference.

BACKGROUND OF THE INVENTION

For a record label, investing in an unknown artist is a high risk business. Most of the artists will fail to make the anticipated "break through". However, when one does succeed, the return of investment far exceeds the initial cost. Locating artists with high probability of future success is thus important for the music industry. There is therefore a great interest in a technique for automatically identifying promising artists at very early stages of their professional life, often before they are noticed by a major record company in the national level.

Local popularity of an emerging artist is an important factor for consideration when looking for a new, previously unknown artists. Artists that are extremely popular in their hometown area have higher potential to make a breakthrough in the national level. By way of example, the local popularity will come as a result of performances in the artist's hometown that will create a word of mouth ripple that will send people to download the artist's songs from a file-sharing application or to listen to the artist's clips on YouTube.

There is therefore a need for simple and reliable means to detect emerging artists.

SUMMARY OF THE INVENTION

A system for detecting a local phenomenon, the system includes an interface for receiving queries information from a system for retrieving art related media, and a processor, configured to: (a) create a first local popularity chart, wherein the creating of the first local popularity chart includes enumerating, for each geographic area of a group of sampled geographic areas, identical query strings of queries that are included in a group of queries; (b) create a first global popularity chart, wherein the creating of the first global popularity chart includes enumerating identical query strings of the queries that are included in the group of queries; and (c) select at least one query string in response to a scoring of the query string at the first local popularity chart and to a scoring of the query string at the first global popularity chart; wherein the group of queries includes queries which were queried during a first period of time.

A method for detecting a local phenomenon, the method includes: (a) creating a first local popularity chart, wherein the creating of the first local popularity chart includes enumerating, for each geographic area of a group of sampled geographic areas, identical query strings of queries that are included in a group of queries; (b) creating a first global popularity chart, wherein the creating of the first global popularity chart includes enumerating identical query strings of the queries that are included in the group of queries; and (c) selecting at least one query string in response to a scoring of the query string at the first local popularity chart and to a scoring of the query string at the first global popularity chart; wherein the group of queries includes queries which were queried during a first period of time.

A computer readable medium having computer-readable code embodied therein for detecting a local phenomenon, the computer readable code includes instructions for: (a) creating a first local popularity chart, wherein the creating of the first local popularity chart includes enumerating, for each geographic area of a group of sampled geographic areas, identical query strings of queries that are included in a group of queries; (b) creating a first global popularity chart, wherein the creating of the first global popularity chart includes enumerating identical query strings of the queries that are included in the group of queries; and (c) selecting at least one query string in response to a scoring of the query string at the first local popularity chart and to a scoring of the query string at the first global popularity chart; wherein the group of queries includes queries which were queried during a first period of time.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1A:
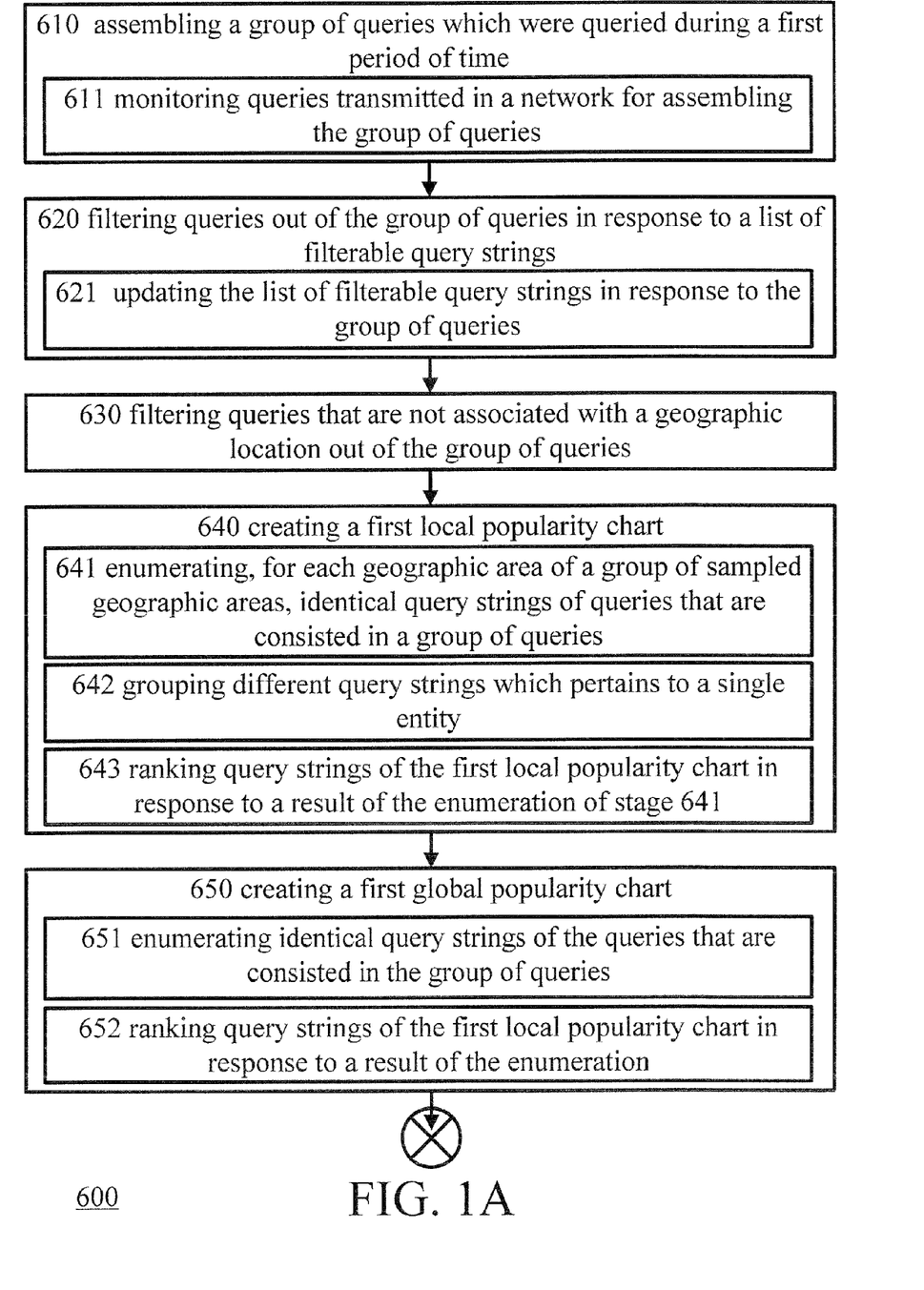
FIGS. 1A and 1B illustrate a method for detecting a local phenomenon, according to an embodiment of the invention.
Figure 1B:
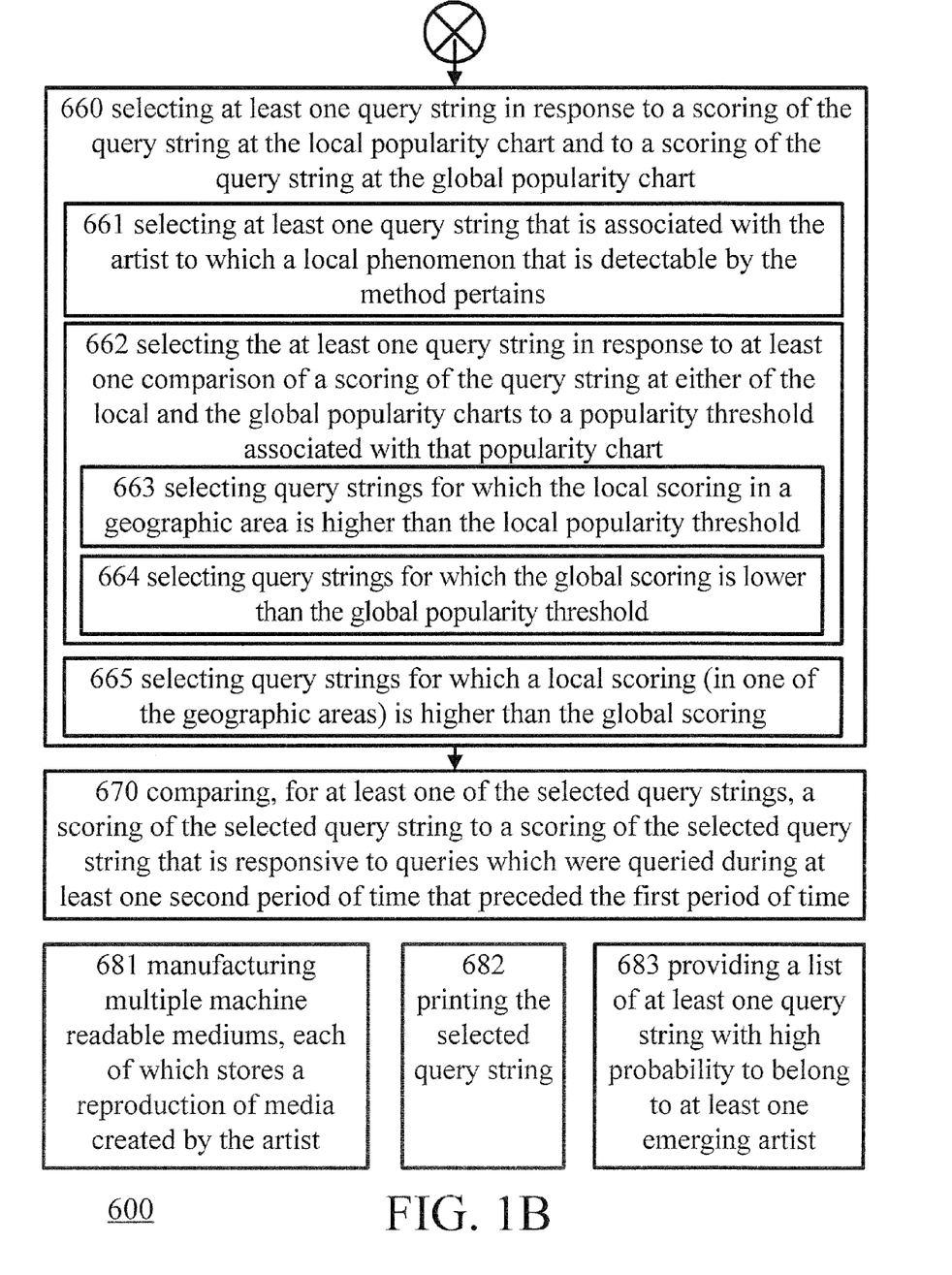

FIGS. 1A and 1B illustrate method 600 for detecting (and/or identifying) a local phenomenon, according to an embodiment of the invention, wherein the stages illustrated in FIG. 1B follow the stages illustrated in FIG. 1A, as indicated by the connection points in the diagrams. It is noted that method 600 may be used for the detection (and/or identification) of different types of local phenomena, such as those phenomena which reflects in an increased interest by local population in such phenomena. Examples of such local phenomena are: an artist which is popular in a given area of the country, but substantially unknown nation-wise; other types of media (e.g. movies, computer games) which are popular locally but not globally, different types of social activities or phenomena (which may be reflected in an interest in the behavior/activity itself, its implications, media representations thereof, and so forth. E.g. an interest in video tutorials of grinding with inline skates); health and medication phenomena (e.g. an outspread of a disease or a medication), interest in commercial products; interests in genres (e.g. music, fashion), cultural phenomena, financial phenomena, political phenomena, and so forth. The local phenomenon is usually related to a conduct in a local area that is different from the usual conduct in a larger area (referred to as global area, even though it is clear it can also be national, metropolitan, etc.).

A specific such phenomenon that is disclosed in detail in relation to method 500 relates to detection of emerging artists, but it is clear that the methods, systems, and computer program products can also relate to other phenomenon, such as financial conduct of individuals or companies, political changes, and so forth.

Method 600 conveniently suggests a database of geographically identified (geo-aware) queries as a target for data mining algorithms, wherein each geo-aware query includes at least a query string (e.g. the string used by a user to search for retrievable media, a string compiled in response to such user made string, and so forth) and a geographic location information pertaining to the geographic location of the user who issued the query. It is noted that the geographically identified queries stored in the database may further include (or be associated with) additional data fields as time the query was issued, related queries by the same user, number of results returned for the query, and so forth.

It is noted that method 600 may be implemented in different embodiments thereof for databases of geographically identified queries which were queried in diverse types of systems. By way of example, the queries may be search-engine queries (e.g. Google, Yahoo), database queries (e.g. medical databases, financial databases), peer-to-peer networks queries, queries provided to human responders, and so on. The queries may be acquired by the system who answers the queries (e.g. a financial database engine), by a system who participates in a transmission of the queries (e.g. a node in a peer-to-peer network structure), by a silent-listener to a system in which the queries (or responses) are transmitted, or in any other way. Also, the acquisition of queries to the database may be carried out by multiple systems (in which redundancy may and may not be checked for, depending on the implementation).

Method 600 conveniently starts with stage 610 of assembling a group of queries which were queried during a first period of time, e.g. one week. It is however noted that stage 610 could be replaced with a stage of receiving the group of queries which were queried during the first period of time.

According to an embodiment of the invention, the queries were used by users of a system for retrieving art related media (it is noted that the term art related media herein refers mainly to art related media that is produced by single artists or bands or small groups of artist, comparing, by way of example and according to some embodiments of the invention, to Hollywood movies etc.), which could be, for example, a peer to peer (P2P) network (such as Gnutella, Bit Torrent, Soulseek, etc.), or a web 2.0 service like YouTube, etc.

According to an embodiment of the invention, the queries of the group of queries (which are later used for creating a first local popularity chart and a first global popularity chart) were queried during the first period of time by users of at least one peer-to-peer network, wherein—according to an embodiment of the invention—the responses to the queries of the group of queries where provided by computers of the peer-to-peer network that are located in different geographic areas of a group of sampled geographic areas (which is discussed below, e.g. in relation to stage 641).

According to an embodiment of the invention, the assembling includes stage 611 of monitoring queries which are transmitted in a network, for assembling the group of queries. It is noted that not all the queries that are transmitted in the network are necessarily collected during the assembling, and that one or more decision rules may be used for determining which query that was detected in the network should be collected.

It is noted that, according to an embodiment of the invention, media (and/or other types of content) that is accessible by such said system is at least partially loaded by users of the system, thus enabling a relatively rare media to be exposed to a wider audience. Such relatively rare media may enable detecting of local phenomena which are not generally known, e.g. media that is produced by emerging artists (which could also be uploaded, for example, by the emerging artists themselves). It is noted that systems which do not provide musical media or video media (e.g. songs of said artists) could also be used for the assembly, e.g. art related search engines etc.

It is noted that, according to an embodiment of the invention, the group of queries could be assembled from queries used for querying in multiple such systems, wherein according to an embodiment of the invention, queries which were used for querying in two different systems may be weighted differently during a later stage of method 600.

Further more, it is noted that the group of queries need not necessarily include all the queries which were queried in such monitored systems. Some of the queries may not be associated with geographical location information; some queries may be identified as non-related and therefore not worthy of storing, and so forth. Additionally, according to an embodiment of the invention, only some of the queries are monitored and/or collected, e.g. according to one or more decision rules, or statistically.

Such a group of queries usually includes a large amount of queries which are not related to the type of local phenomenon—e.g. for emerging artists (e.g. many queries in such systems are related to pornographic material). Referring to local phenomena which relates to media, it is noted by way of example that as such systems may be used for retrieval of other information but art related media (such systems may also facilitate retrieving movies, documents, etc.), the group of queries may include a large amount of non-art related media queries. This may also be the case for other types of local phenomena.

Additionally, in many case such systems are widely used for retrieval of information of global interest—e.g. art related media of already well known artists (such as Madonna, Beatles, Avril Lavigne, etc.), which may not be useful for the detection of local phenomena. Other artists (or other phenomenon of interest) may not be very well known globally, but have already gained a niche, and are not likely to become a national or global success.

Many of those unrelated queries (e.g. queries for non-art related media), as well of those pertaining to very well known phenomena and to already known phenomena, are queried pretty much evenly over time (e.g. during different weeks). According to an embodiment of the invention, stage 610 is followed by stage 620 of filtering queries out of the group of queries in response to a list of filterable query strings, which conveniently includes a list of the top most frequently queried query strings.

According to an embodiment of the invention, method 600 further includes stage 621 of updating the list of filterable query strings in response to the group of queries. By way of example, the 2000 most frequently queried query strings may be regarded as filterable, since they most likely do not pertain to emerging artists or to a new local phenomenon. Conveniently, query strings are only added to the list of filterable query strings and not removed therefrom.

It is noted that an emerging artist or band, for example, may be named by a string at least partially matching to a query string of the list of filterable query strings (e.g. after a name of a famous movie). However, in all likelihood most of the songs of said emerging artist will not be such named, and thus the filtering will most likely will not lead to overlooking said emerging artist.

It should be noted that as the search is directed, according to an embodiment of the invention, toward finding emerging artists (or other yet undiscovered local phenomenon), the looked for query strings are of fairly rare queries—those that are not even on the top 2000 list, trying to detect emerging artists with higher potential to make a national level breakthrough.

As the invention is based on detecting (and/or identifying) a local phenomenon while still only locally known, and not widely known, method 600 is based on finding queries which were only used for querying by users from a limited geographical area. In many systems for retrieving art related media (or other monitored systems), the queries (or at least a significant portion of which) are associated with geographic location information (e.g. an IP address or a location of a node of a P2P system to which the query was originally sent).

Method 600 conveniently continues with stage 630 of filtering queries that are not associated with a geographic location out of the group of queries, to provide a group of geo-aware queries. According to an embodiment of the invention, stage 630 further includes filtering out of the group of queries queries that are not associated with a geographic area of a group of sampled geographic areas (e.g. method 600 may be applied only to US locations, trying to locate US emerging artists, and thus queries initiating from other countries may be discarded).

Method 600 continues with stage 640 of creating a first local popularity chart. According to an embodiment of the invention, the creating is carried out by a hardware chart generator (which may and may not be the hardware processor of stage 660). It is noted that conveniently, multiple such local popularity charts are generated for different sampled geographic areas, all pertaining to the first period of time. Different sampled geographic areas may and may not partially over-lap.

Stage 640 conveniently includes stage 641 of enumerating, for each geographic area of a group of sampled geographic areas, identical query strings of queries that are included in the group of queries (e.g. the query string "Gogol bordello" may be queried 43 times in Los Angeles, and 13 times in Montgomery, Ala.). It is noted that the terms relating to popularity charts used in this disclosure could also be referred to, according to an embodiment of the invention, as popularity distributions, A result of the enumeration is conveniently a scoring for each query strings, wherein the scoring may be the number of times each query string was used for querying, but it may also be a manipulation thereof (e.g. using a normalizing function).

For example, the normalizing function may not be linear. Also, different normalizing functions may be used for different geographical areas.

According to an embodiment of the invention, stage 640 includes stage 642 of grouping different query strings which pertains to a single entity (e.g. a certain artist), so that said query strings would be enumerated together, wherein stage 642 can be carried out either before or after the enumerating, wherein a result of the enumerating pertains to the grouped query strings.

It is noted that the grouping of stage 642 is conveniently carried out automatically, in response to query strings grouping information, and may also include updating of the query strings grouping information, e.g. in response to query strings that include both the name of the artist and a name of the song. By way of example, the query string "gogol bordello start wearing purple" may enable the associating of the query string "start wearing purple" with the band Gogol bordello, even if such association is not previously known.

According to an embodiment of the invention, stage 640 includes stage 643 of ranking query strings (or groups thereof) of the first local popularity chart according to the number of geo-aware queries made using each query string (or a group thereof). By way of example, the most queried for query string (or a group of query strings) would be ranked 1st, and so forth. It is noted that the following stages may be carried out either by a scoring responsive to the actual enumeration associated with each query string (or a group of query strings), or by a scoring responsive to the ranking of each such query, mutatis mutandis.

Stage 640 is followed by stage 650 of creating a first global popularity chart. According to an embodiment of the invention, the creating of stage 650 is carried out by the hardware chart generator. Stage 650 conveniently includes stage 651 of enumerating identical query strings of the queries that are included in the group of queries. As disclosed in relation to stage 640, different query strings may be enumerated together, e.g. if belongs to the same artist.

According to an embodiment of the invention, stage 650 includes stage 652 of ranking query strings (or groups thereof) of the first global popularity chart according to a result of the enumeration (e.g. to the number of geo-aware queries made using each query string or a group thereof). By way of example, the query string (or a group of query strings) queried for the most would be ranked 1st, and so forth. It is noted that the following stages may be carried out either by a scoring that is responsive to the actual enumeration associated with each query string (or a group of query strings), or by a scoring that is responsive to the ranking of each such query, mutatis mutandis.

Stage 650 is followed by stage 660 of selecting at least one query string in response to a scoring of the query string at the first local popularity chart (or at least one of which, if multiple local popularity charts are created) and to a scoring of the query string at the global popularity chart. According to an embodiment of the invention, the selecting is carried out by a hardware processor (which may and may not include, be a part of, or be otherwise associated with the hardware chart generator).

It is noted that according to an embodiment of the invention, the local phenomenon pertains to an artist (e.g. an emerging artist), and wherein the selecting includes selecting at least one query string that is associated with the artist.

stage 660 includes stage 661 of selecting at least one query string that is associated with an artist to which a local phenomenon that is detectable by the method pertains.

According to an embodiment of the invention, stage 660 includes stage 661 of selecting the at least one query string (or group thereof) in response to at least one comparison of a scoring of the query string at either of the first local popularity chart and the first global popularity chart of each query string (or a group of query strings) to a popularity threshold that is associated with that popularity chart.

According to an embodiment of the invention, stage 660 includes stage 663 of selecting query strings for which the local scoring in a geographic area is higher than the local popularity threshold, and/or stage 664 of selecting query strings for which the global scoring is lower than the global popularity threshold.

According to an embodiment of the invention, stage 660 includes stage 665 of selecting query strings for which a local scoring (in at least one of the sampled geographic areas) is higher than the global scoring.

According to an embodiment of the invention, both a local and a global popularity thresholds, $T_l$ and $T_g$ respectively, are defined (wherein conveniently $T_g \geq T_l$ if the same scoring methods are used). Suppose that $r_g(i)$ and $r_l(i)$ are a query strings's global and local charts scoring or ranking at week i respectively. E.g., according to an embodiment of the invention, $r_g(i)$ is the ranking of a query in the US queries popularity chart, and, $r_l(i)$ is the ranking in a local geographic area (e.g. city's) popularity chart. According to an embodiment of the invention, queries that relates to an emerging local phenomenon (e.g. emerging artists) will bold that for a specific geographic area the following conditions will be fulfilled:
 a. $r_l(i) \leq T_l$, that assures a minimum level of local popularity, meaning the artist has a stronghold of hometown audience;
 b. $r_g(i) \geq T_g$, that assures the artist is not globally popular; and
 c. $r_l(i) \leq r_g(i)$, that requires that the local popularity ranking will be higher than the global one.

Therefore, according to an embodiment of the invention, stage 660 includes stage 663 of selecting query strings for which the local scoring in a geographic area is higher than the local popularity threshold (thus assuring a minimum level of local popularity, meaning the artist has a stronghold of hometown audience).

Likewise, according to an embodiment of the invention, stage 660 includes stage 664 of selecting query strings for which the global scoring is lower than the global popularity threshold (thus assuring that the local phenomenon is not a global one). It is noted that, as according to an embodiment of the invention, the most popular query strings were filtered out of the group of queries in response to the list of filterable query strings during stage 620, stage 660 may not include stage 664.

Similarly, according to an embodiment of the invention, stage 660 includes stage 665 of selecting query strings for which a local scoring (in said geographic area) is higher than the global one, and conveniently, higher by at least a predetermined value (i.e. $r_l(i) \leq r_g(i) - A$).

Conveniently, stage 660 includes selecting all and only the query strings (or the groups of which) which qualified for all of stages 663, 664 and 665 (or at least those carried out), to provide a group of selected query strings (or group of selected groups of query strings).

All of the query strings (or groups thereof) selected in stage 660 are potentially associated with local phenomena sought for (e.g. emerging artists), as such local phenomena are usually characterized by high divergence values. However, even though one might expect high divergence to be a good indication for a desirable local phenomenon such as an emerging artist (in accordance with the work of Garber et al, where it was shown that high values of divergence in innovations, indicate higher probability to succeed), an attempt to detect such local phenomena based directly on the divergence measurement is typically not effective enough.

E.g. in the case of rare spelling mistakes and typos, if someone mistakenly typed in something just once, and he is the only one who queried for that query string (or at least it's the only time our interception system captured that string during that week), the distribution vector of that string would be a perfect delta vector. The divergence value will be maximized, but surely this string doesn't represent an emerging artists.

Additionally, the divergence alone is usually insufficient in order to predict success, as it only considers the geographical distribution of the queries while disregards their popularity strength. The above mentioned three conditions allowed us to eliminate rare queries, while still maintaining the demand for non uniform distribution.

Detecting locally popular phenomena (e.g. artists) can be performed on queries from any city, or region. It is noted that, according to an embodiment of the invention, method 600 focuses on major US cities, since more emerging artists, especially rappers, are active in urban concentrations.

According to an embodiment of the invention, stage 660 is followed by stage 670 of comparing, for at least one of the selected query strings, a scoring of the selected query string to a scoring of the selected query string that is responsive to queries which were queried during at least one second period of time that preceded the first period of time.

Conveniently, the first and the second periods of time are of equal duration (e.g. each of which lasted a week), even though that it is clear to a person who is skilled in the art that compensating for different durations could be easily achieved. According to an embodiment of the invention, the first period of time immediately follows the second period of time, as method 600 is carried out continually, but this is not necessarily so. It is noted that, according to an embodiment of the invention, the first and the second periods of time may partly overlap.

It is noted that according to different embodiments of the invention, the comparing of stage 670 may include comparing the scoring of the query strings during the first period of time to the scoring of those query strings that were gathered at different time spans prior to the first local popularity chart (e.g. in the week prior, and a week before that).

Conveniently, for each such query string, the algorithm examines the local chart rank values up to n weeks to past, and looks for "promising" patterns. In other words, the algorithms looks for pattern in the tuple $R_l = r_l(0), r_l(1), \ldots, r_l(n)$, where rl(j) is the local popularity of the query string j weeks ago. If a desired pattern is found, the algorithm outputs the string.

The output of the algorithm is a list of query strings with high probability to belong to emerging artists. According to an embodiment of the invention, method 600 includes stage 683 of providing a list of at least one query string with high probability to belong to at least one emerging artist. It is noted that according to an embodiment of the invention, method 600 includes providing a list of at least one of the selected query strings.

According to some embodiments of the invention, at least one of the following patterns is looked for:
 a. $R_l(1) > R_l(0)$;
 b. $R_l(2) > R_l(0)$;
 c. $R_l(1) > R_l(0)$ and $R_l(2) > R_l(1)$;
 d. $R_l(2) > R_l(0)$ and $R_l(1) - R_l(0) > R_l(2) - R_l(1)$;
 e. $R_l(2) > R_l(1)$, $R_l(1) > R_l(0)$, and $R_l(1) - R_l(0) > R_l(2) - R_l(1)$;

It is clear to a person who is skilled in the art that other patterns may be implemented as well, and that those patterns may pertain to more than three periods of time. Additionally, it is noted that according to an embodiment of the invention, no pattern is implemented or is looked for.

According to an embodiment of the invention, the selecting of the at least one query string in stage 660 is followed by at least one of stages 681 of manufacturing multiple machine readable mediums, each of which stores a reproduction of media created by the artist, and stage 682 of printing the selected query string.

Figure 2:
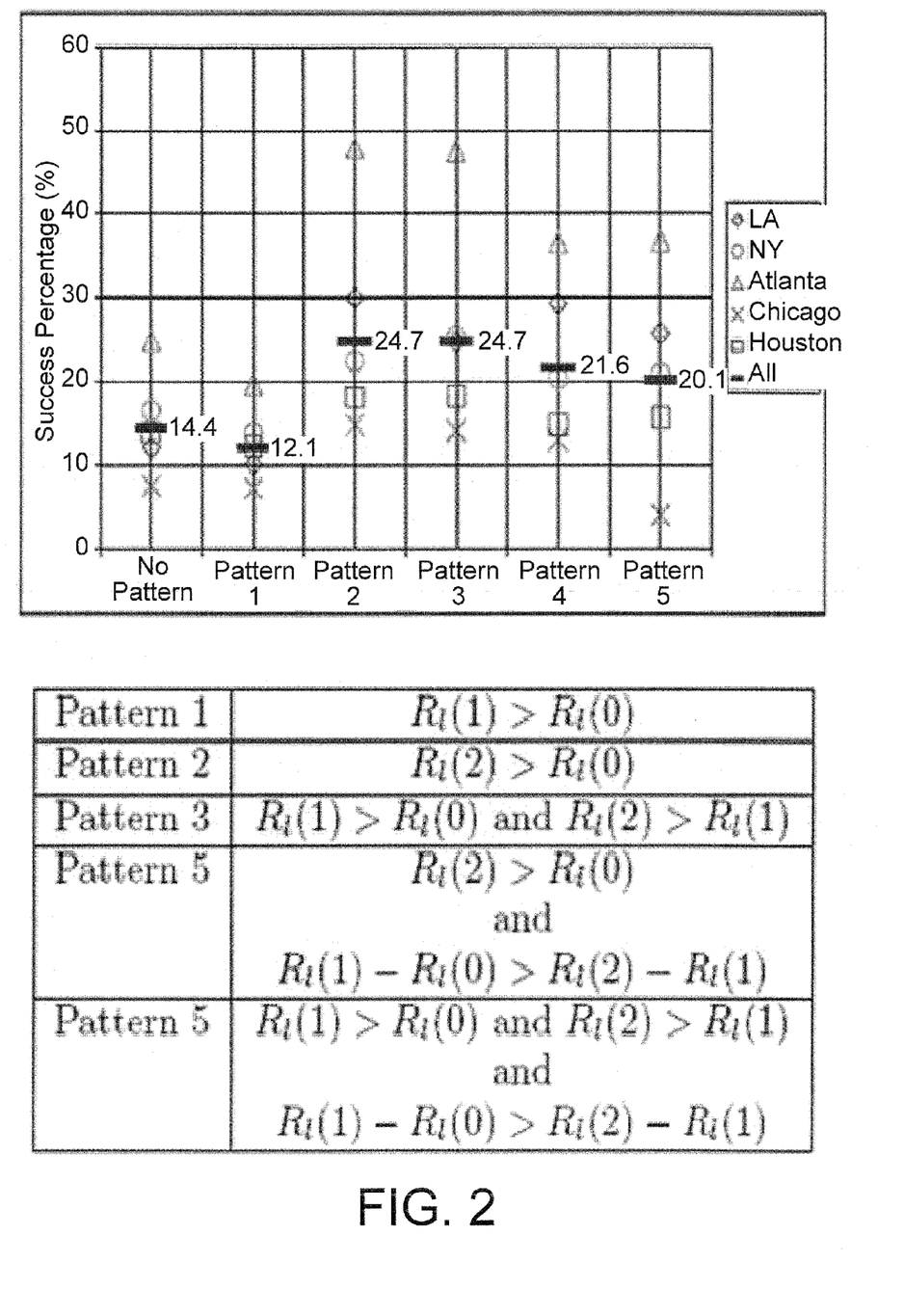
FIG. 2 illustrates success percentage for several patterns, as retrieved according to an embodiment of the invention.

FIG. 2 illustrates success percentage for the above discussed patterns, as retrieved according to an embodiment of the invention in which emerging artists are sought after. It is noted that according to some of those patterns, The detection algorithm spots artists 6-8 weeks before they make their national break through, and in some cases even much earlier.

According to an embodiment of the invention, an identifying of an origin of a captured query (which usually would not in information regarding its origin) is responsive to an "Out Of Band" (OOB) return IP address that is included in the query. Conveniently, such an OOB address allows clients that have content matching a query to respond to a location close to the origin of the query, without having to backtrack the path taken by the query message. It is noted that in many situations, queries may come from firewalled clients, and in most such cases the OOB address will belong to the ultra peer connected to the query origin, acting as a proxy on behalf of the query originator.

According to an embodiment of the invention, sampled geographical areas differ in the amount of total query strings originating from them; wherein a vector Q represents the distribution of query strings in the sampled geographic areas. Component Q(i) is the fraction of total query strings originated from region i of the number of total query strings in all the regions:

$$Q(i) = \frac{R(i)}{\sum_{i=0}^{N} R(i)} \quad (4)$$

where R(i) is the number of query strings in region i and N is the number of regions. Below Q is used for the distribution vector of all the intercepted queries, and P is used for the distribution of queries specific to some artist or song, namely $$P(i) = \frac{R_s(i)}{\sum_{i=0}^{N} R_s(i)} \quad (5)$$

where Rest(i) is the number of queries for the set of strings s in region i and N is the number of regions.

According to an embodiment of the invention, the selecting of the selected query strings is responsive to a divergence of the queried string.

Figure 3:
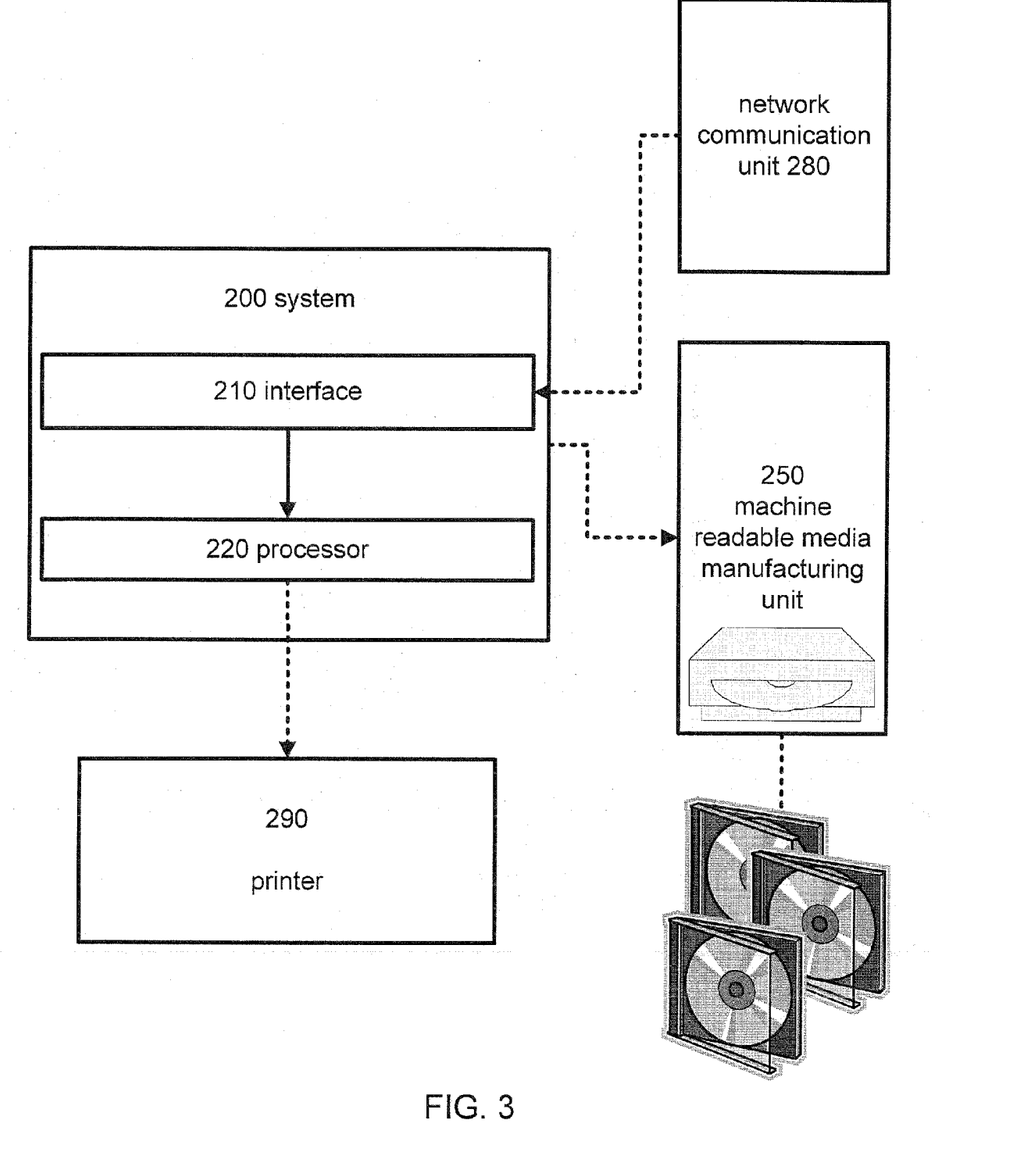
FIG. 3 illustrates a system for detecting a local phenomenon, according to an embodiment of the invention.

FIG. 3 illustrates system 200 for detecting (and/or identifying) a local phenomenon, according to an embodiment of the invention. System 200 includes hardware interface 210 for receiving queries information from a system for retrieving art related media (to which system 200 is conveniently connected, however, this is not necessarily so). System 200 also include hardware processor 220 that is configured to: (a) create a first local popularity chart, wherein the creating of the first local popularity chart includes enumerating, for each geographic area of a group of sampled geographic areas, identical query strings of queries that are included in a group of queries; (b) create a first global popularity chart, wherein the creating of the first global popularity chart includes enumerating identical query strings of the queries that are included in the group of queries; and (c) select at least one query string in response to a scoring of the query string at the first local popularity chart and to a scoring of the query string at the first global popularity chart; wherein the group of queries includes queries which were queried during a first period of time.

It is noted that conveniently, system 200 is configured to carry out method 500 and/or method 600, and different embodiments of system 200 can carry out at least the above disclosed embodiments of method 600, and of method 500 below. Conveniently, method 500 and/or method 600 may be implemented by a system similar to system 200.

According to an embodiment of the invention, the local phenomenon pertains to an artist, and wherein processor 220 is further configured to select at least one query string that is associated with the artist.

According to an embodiment of the invention, system 200 further includes machine readable media manufacturing unit 250, that may and may not be connected to processor 220, that is adapted to receive media that is created by the artist and to manufacture multiple non-transitory machine readable mediums, each of which stores a reproduction of media created by the artist.

According to an embodiment of the invention, wherein the group of queries includes queries which were queried during the first period of time by users of at least one system for retrieving art related media.

According to an embodiment of the invention, the group of queries includes queries which were queried during the first period of time by users of at least one peer-to-peer network, wherein the responses to the queries of the group of queries where provided by computers of the peer-to-peer network that are located in different geographic areas of the group of sampled geographic areas.

According to an embodiment of the invention, processor 220 is further configured to select the query strings in response to at least one comparison of a scoring of the query string at either of the first local popularity chart and the first global popularity chart to a popularity threshold associated with that popularity chart.

According to an embodiment of the invention, system 200 further includes network communication unit 280 (which may and may not be connected to interface 210) that is configured to monitor queries that are transmitted in a network, wherein system 200 is further configured to assemble the group of queries, prior to the creating of the first local popularity chart and the first global popularity charts.

According to an embodiment of the invention, processor 220 is further configured to filter queries out of the group of queries in response to a list of filterable query strings According to an embodiment of the invention, processor 220 is further configured to group different query strings which pertains to a single entity.

According to an embodiment of the invention, processor 220 is further configured to rank query strings of a popularity chart in response to a result of the enumeration for each query string, wherein the popularity chart is one of the first local popularity chart and the first global popularity chart.

According to an embodiment of the invention, system 200 further includes an interface (not illustrated) for providing a list of at least one query string with high probability to belong to at least one emerging artist.

According to an embodiment of the invention, processor 220 is further configured to compare, for at least one of the selected query strings, a scoring of the selected query string to a scoring of the selected query string that is responsive to queries which were queried during at least one second period of time that preceded the first period of time.

According to an embodiment of the invention, processor 220 is further configured to select query strings for which one or more of the following conditions is true:
(a) $R_f(1) > R_f(0)$;
(b) $R_f(2) > R_f(0)$;
(c) $R_f(1) > R_f(0)$ and $R_f(2) > R_f(1)$;
(d) $R_f(2) > R_f(0)$ and $R_f(1) - R_f(0) > R_f(2) - R_f(1)$; and
(e) $R_f(2) > R_f(1)$, $R_f(1) > R_f(0)$, and $R_f(1) - R_f(0) > R_f(2) - R_f(1)$;

wherein $R_f(j)$ is the local popularity of the query string at a j-th period of time.

According to an embodiment of the invention, processor 220 is configured to treat groups of one or more queried strings where a queried string is taught to be treated.

According to an embodiment of the invention, system 200 further includes a printer 290, connected to processor 220, for printing the selected query string.

According to an embodiment of the invention, a first computer readable medium having first computer-readable code embodied therein for detecting local phenomenon is disclosed. The first computer readable code includes instructions for: (a) creating a first local popularity chart, wherein the creating of the first local popularity chart includes enumerating, for each geographic area of a group of sampled geographic areas, identical query strings of queries that are included in a group of queries; (b) creating a first global popularity chart, wherein the creating of the first global popularity chart includes enumerating identical query strings of the queries that are included in the group of queries; and (c) selecting at least one query string in response to a scoring of the query string at the first local popularity chart and to a scoring of the query string at the first global popularity chart; wherein the group of queries includes queries which were queried during a first period of time.

According to an embodiment of the invention, the local phenomenon pertains to an artist, and the selecting includes selecting at least one query string that is associated with the artist.

According to an embodiment of the invention, the instructions included in the first computer readable code for the creating of the first local popularity chart and the creating of the first global popularity charts are carried out for the group of queries that include queries which were queried during the first period of time by users of at least one system for retrieving art related media.

According to an embodiment of the invention, the instructions included in the first computer readable code for the creating of the first local popularity chart and the creating of the first global popularity charts are carried out for the group of queries that includes queries which were queried during the first period of time by users of at least one peer-to-peer network, wherein the responses to the queries of the group of queries where provided by computers of the peer-to-peer network that are located in different geographic areas of the group of sampled geographic areas.

According to an embodiment of the invention, the instructions included in the first computer readable code for the selecting are further responsive to at least one comparison of a scoring of the query string at either of the first local popularity chart and the first global popularity chart to a popularity threshold associated with that popularity chart.

According to an embodiment of the invention, the first computer readable code further includes instructions for monitoring queries that are transmitted in a network, for assembling the group of queries, prior to the creating of the first local popularity chart and the first global popularity charts.

According to an embodiment of the invention, the first computer readable code further includes instructions for filtering queries out of the group of queries in response to a list of filterable query strings According to an embodiment of the invention, the first computer readable code further includes instructions for grouping different query strings which pertains to a single entity.

According to an embodiment of the invention, the first computer readable code further includes instructions for ranking query strings of a popularity chart in response to a result of the enumeration for each query string, wherein the popularity chart is one of the first local popularity chart and the first global popularity chart.

According to an embodiment of the invention, the first computer readable code further includes instructions for providing a list of at least one query string with high probability to belong to at least one emerging artist.

According to an embodiment of the invention, the first computer readable code further includes instructions for comparing, for at least one of the selected query strings, a scoring of the selected query string to a scoring of the selected query string that is responsive to queries which were queried during at least one second period of time that preceded the first period of time.

According to an embodiment of the invention, the comparing of the scorings includes selecting query strings for which one or more of the following conditions is true:
(a) $R_f(1) > R_f(0)$;
(b) $R_f(2) > R_f(0)$;
(c) $R_f(1) > R_f(0)$ and $R_f(2) > R_f(1)$;
(d) $R_f(2) > R_f(0)$ and $R_f(1) - R_f(0) > R_f(2) - R_f(1)$; and
(e) $R_1(2) > R_f(1)$, $R_f(1) > R_f(0)$, and $R_f(1) - R_f(0) > R_f(2) - R_f(1)$;

wherein $R_f(j)$ is the local popularity of the query string at a j-th period of time.

According to an embodiment of the invention, the instructions for at least one stage that applies to a query string are carried out for a group of queried strings.

According to an embodiment of the invention, the first computer readable code further includes instructions for printing the selected query string.

According to an aspect of the invention, a second computer readable medium having computer-readable code embodied therein for detecting a local phenomenon, the second computer readable code includes instructions for: (a) creating a first local popularity chart, wherein identical query strings of different queries of a group of queries are enumerated for each geographic area of a group of sampled geographic areas; (b) creating a first global popularity chart, wherein identical query strings of different queries of the group of queries are enumerated; and (c) selecting query strings in response to comparison of the local and the global popularity charts of each query string to at least one of a local popularity threshold and a global popularity threshold; wherein the group of queries includes queries which were queried during a first period of time, wherein the queried information relates to a manifestation of the phenomenon. Thus, a query for music may teach of emerging artists that are known locally but not globally, a query for news may teach about a local interest that is not yet global, and so forth.

According to an aspect of the invention, a second computer readable medium having computer-readable code embodied therein for detecting emerging artists is disclosed, the second computer readable code includes instructions for: (a) assembling a group of queries which were queried during a first period of time; (b) filtering queries out of the group of queries in response to a list of filterable query strings; (c) filtering out of the group of queries queries that are not associated with a geographic location; (d) creating a first local popularity chart; (e) creating a first global popularity chart; (f) selecting query strings (or groups thereof) in response to comparison of the local and the global popularity charts of each query string (or a group of query strings) to a local popularity threshold and/or to a global popularity threshold; and (g) comparing the ranking of each of the selected query strings or groups thereof (that pertains to information gathered during the first period of time) to a the ranking of the selected query strings that pertains to information gathered during a second period of time that preceded the first period of time.

It is noted that, according to different embodiments of the invention, the second computer readable code includes instructions for the carrying out of additional stages of method 500, as disclosed above.

According to an aspect of the invention, a system for detecting a local phenomenon is disclosed, the system for detecting the local phenomenon includes: (a) an interface for receiving queries information from a system for retrieving art related media, and (b) a processor, that is adapted to carry out the following processes: (i) creating a first local popularity chart, wherein identical query strings of different queries of a group of queries are enumerated for each geographic area of a group of sampled geographic areas; (ii) creating a first global popularity chart, wherein identical query strings of different queries of the group of queries are enumerated; and (iii) selecting query strings in response to comparison of the local and the global popularity charts of each query string to at least one of a local popularity threshold and a global popularity threshold; wherein the group of queries includes queries which were queried during a first period of time, wherein the queried information relates to a manifestation of the phenomenon. Thus, a query for music may teach of emerging artists that are known locally but not globally, a query for news may teach about a local interest that is not yet global, and so forth.

According to an embodiment of the invention, a system for detecting emerging artists is disclosed, the system includes an interface for receiving queries information from a system for retrieving art related media, and a processor that is adapted to carry out the following processes: (a) assembling a group of queries which were queried during a first period of time; (b) filtering queries out of the group of queries in response to a list of filterable query strings; (c) filtering, out of the group of queries, queries that are not associated with a geographic location; (d) creating a first local popularity chart; (e) creating a first global popularity chart; (f) selecting query strings (or groups thereof) in response to comparison of the local and the global popularity charts of each query string (or a group of query strings) to a local popularity threshold and/or to a global popularity threshold; and (g) comparing the ranking of each of the selected query strings or groups thereof (that pertains to information gathered during the first period of time) to a the ranking of the selected query strings that pertains to information gathered during a second period of time that preceded the first period of time.

It is noted that, according to different embodiments of the invention, processor 220 is further adapted to carry out additional processes corresponding to additional stages of method 500, as disclosed above.

Figure 4:
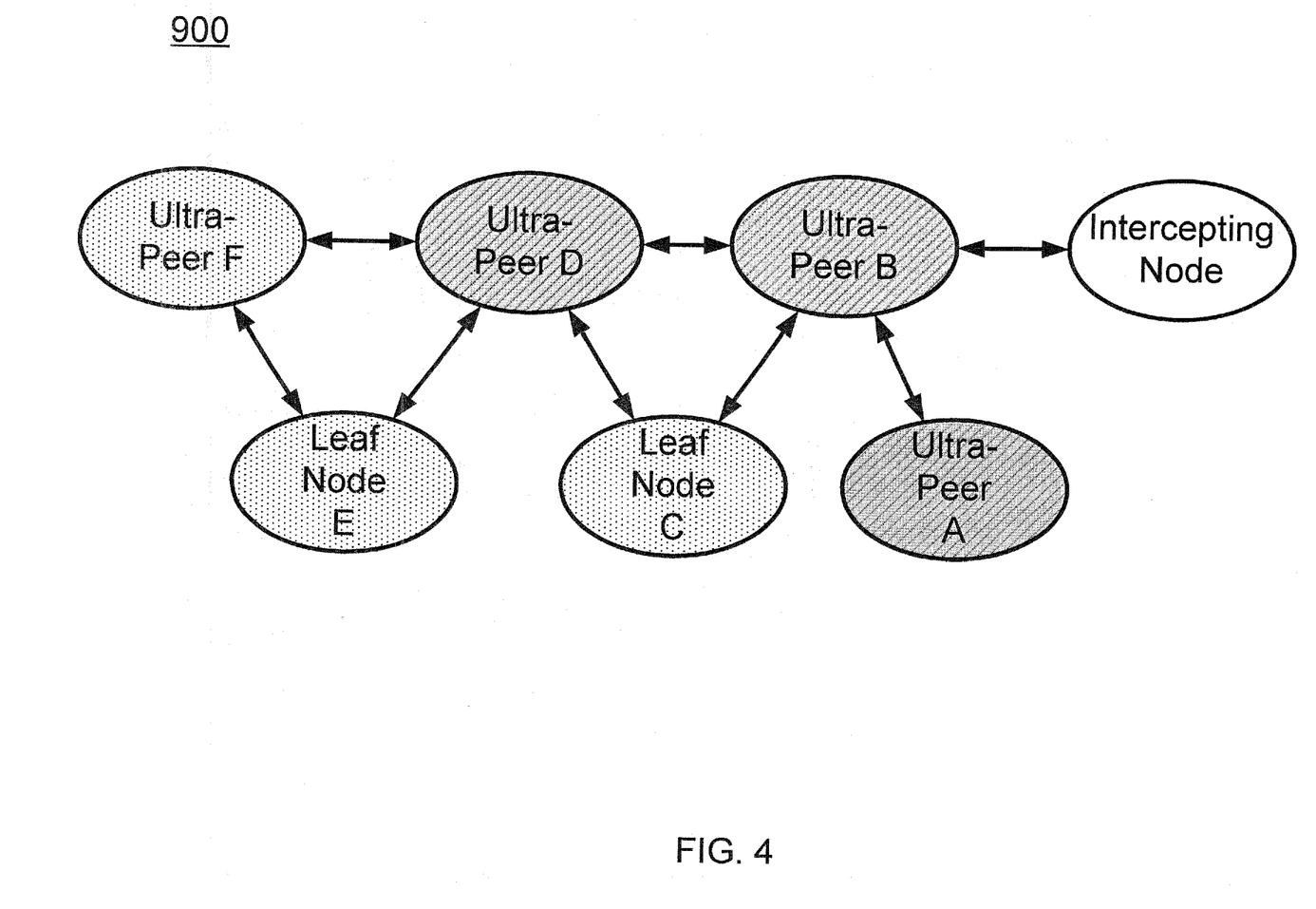
FIG. 4 illustrates a small network segment according to an embodiment of the invention.

FIG. 4 illustrates a small network segment containing an intercepting node, along with other ultrapeers and leafs, according to an embodiment of the invention. Ultrapeer B is directly connected to the Intercepting node. Thus any query that traversed only a single hop must have come from it, and we thus know its IP address. Leaf A, leaf C (firewalled), and ultrapeer D are at a distance of two hops away. We cannot easily distinguish between queries coming from A, C, and D. Furthermore, queries originating at C will contain B's OOB return address as C is firewalled or otherwise unable to accept incoming connections.

However as we are directly connected to ultrapeer B, we can simply compare the query's OOB address with B's address. If they are not identical, the query must have come from A or D, and the address is guarantied to be the origin's address. If the query contain B's address but passed two hops, it must be acting as a proxy for C. In this case C's address is not available, and the query is not recorded. Ultrapeer F and leaf E are at a distance of 3 hops away. When we intercept their queries we cannot know whether the OOB IP address belong to them, or perhaps to ultrapeer D acting as a proxy for E. Thus any query that traversed 3 hops or more is discarded.

As a result, an intercepting node records traffic originating from its immediate neighborhood only (having a hop count ≦2), thus requiring a massive deployment of such nodes. The described setting eliminates most of the bias against popular queries which travel only short distances before being satisfied. Discarding queries that traveled more than two hops cancels the advantage of "rare" queries that stay in the network longer. However, this setting does introduce a bias against queries from firewalled clients, as only queries that can receive incoming connections are recorded.

Figure 5:
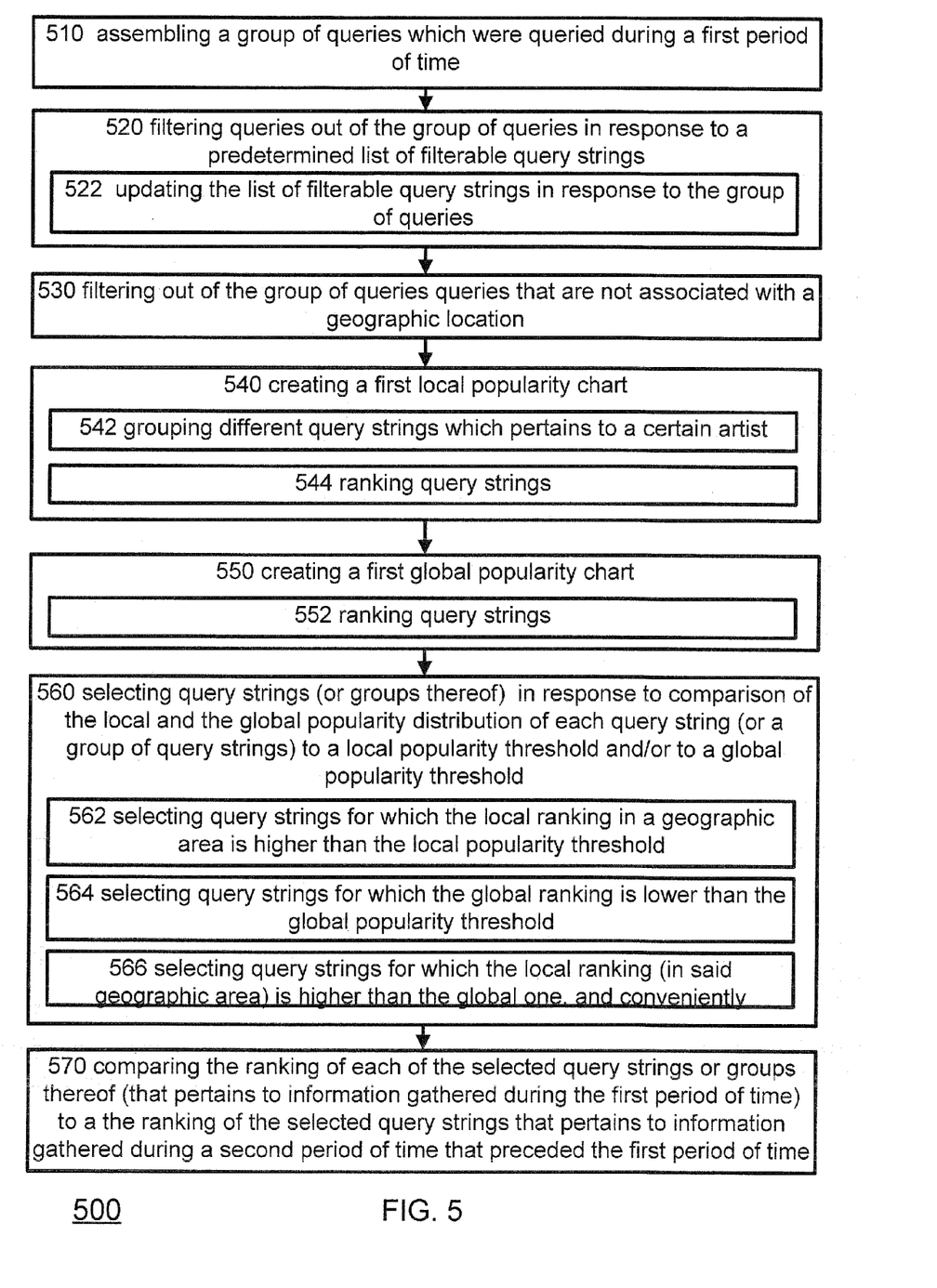
FIG. 5 illustrates a method for detecting emerging artists, according to an embodiment of the invention.

FIG. 5 illustrates method 500 for detecting emerging artists, according to an embodiment of the invention.

Method 500 suggests a database of geographically identified (geo-aware) queries as a target for data mining algorithms, wherein each geo-aware query includes at least a query string (i.e. the string used by a user to search for retrievable media) and a geographic location information pertaining to the geographic location of the user. We demonstrate how valuable commercial information regarding the potential success of emerging artists can be extracted from such a database.

It is noted that conveniently, some or all of the stages of method 500 are carried out by one or more hardware processors, which may and may not be located at different locations and/or belong to different systems.

Method 500 conveniently starts with stage 510 of assembling a group of queries which were queried during a first period of time, e.g. one week. It is however noted that stage 510 could be replaced with a stage of receiving the group of queries which were queried during the first period of time. Conveniently, the queries were used by users of a system for retrieving art related media (it is noted that the term art related media herein refers mainly to art related media that is produced by single artists or bands or small groups of artist, and conveniently not, for example, to Hollywood movies etc.), which could be, for example, a peer to peer (P2P) network (such as Gnutella, Bit Torrent, Soulseek, etc.), or a web 2.0 service like YouTube, etc.

It is noted that, conveniently, media accessible by such said system is at least partially loaded by users of the system, thus enabling a relatively rare media (like the media produced by emerging artists, which could also be uploaded, for example, by the emerging artists themselves) to be exposed to a wider audience. It is noted that systems which do not provide musical media or video media (e.g. songs of said artists) could also be used for the assembly, e.g. art related search engines etc.

It is noted that, according to an embodiment of the invention, the group of queries could be assembled from queries used for querying in multiple such systems, wherein according to an embodiment of the invention, queries which were used for querying in two different systems may be weighted differently during a later stage of method 500.

Such a group of queries usually includes a large amount of queries which are not related to emerging artists (e.g. many queries in such systems are related to pornographic material). For example, it is noted that as said systems may be used for retrieving of other information but art related media (such systems may also facilitate retrieving movies, documents, etc.), the group of queries may include a large amount of non-art related media queries.

Additionally, those systems are naturally usually widely use for retrieving art related media of already well known artists (e.g. Madonna, Beatles, Avril Lavigne, etc.), which are not interesting for the purposes of the invention. Other artist may not be very well known, but have already gained a niche, and are not likely to become a national or global success.

Many of those non-art related media queries, as well of those pertaining to very well known artists, are queried pretty much evenly over time (i.e. during different weeks). According to an embodiment of the invention, stage 510 is followed by stage 520 of filtering queries out of the group of queries in response to a list of filterable query strings, which conveniently includes a list of the top most frequently queried query strings.

According to an embodiment of the invention, method 500 further includes stage 522 of updating the list of filterable query strings in response to the group of queries. By way of example, the 2000 most frequently queried query strings may be regarded as filterable, since most likely they don't pertain to emerging artist. Conveniently, query strings are only added to the list of filterable query strings and not removed therefrom.

It is noted that an emerging artist or band may be named by a string at least partially matching to a query string of the list of filterable query strings (e.g. after a name of a famous movie) However, in all likelihood most of the songs of said emerging artist will not be such named, and thus the filtering will most likely will not lead to overlooking said emerging artist.

It should be noted that as the search is directed toward finding emerging artists, the looked for query strings are of fairly rare queries, those that are not even on the top 2000 list, trying to detect emerging artists with higher potential to make a national level breakthrough.

As the invention is based on finding emerging artist while still only locally known, and not widely known, method 500 is based on finding queries which were only used for querying by users from a limited geographical area. In many systems for retrieving art related media, the queries (or at least a significant portion of which) are associated with geographic location information (e.g. an IP address or a location of a node of a P2P system to which the query was originally sent).

Method 500 conveniently continues with stage 530 of filtering out of the group of queries queries that are not associated with a geographic location, to provide a group of geo-aware queries. According to an embodiment of the invention, stage 530 further includes filtering out of the group of queries queries that are not associated with a geographic area of a group of sampled geographic areas (e.g. method 500 may be applied only to US locations, trying to locate US emerging artists, and thus queries initiating from other countries may be discarded).

Method 500 continues with stage 540 of creating a first local popularity chart, wherein identical query strings of different queries of the group of queries are enumerated for each geographic area of the group of sampled geographic areas (e.g. the query string "Gogol bordello" may be queried 43 times in Los Angeles, and 13 times in Montgomery, Ala.). It is noted that the terms relating to popularity charts used in this disclosure could also be referred to, according to an embodiment of the invention, as popularity distributions.

According to an embodiment of the invention, stage 540 includes stage 542 of grouping different query strings which pertains to a certain artist, so that said query strings would be enumerated together, wherein stage 542 can be carried out either before or after the enumerating. It is noted that the grouping of stage 542 is conveniently carried out automatically, in response to query strings grouping information, and may also include updating of the query strings grouping information, e.g. in response to query strings that include both the name of the artist and a name of the song. By way of example, the query string "gogol bordello start wearing purple" may enable the associating of the query string "start wearing purple" with the band Gogol bordello, even if such association is not previously known.

According to an embodiment of the invention, stage 540 includes stage 544 of ranking query strings (or groups thereof) of the first local popularity chart according to the number of geo-aware queries made using each query string (or a group thereof). By way of example, the query string (or a group of query strings) queried for the most would be ranked 1, and so forth. It is noted that the following stages may be carried out either by the actual enumeration associated with each query string (or a group of query strings), or by the ranking thereof, mutatis mutandis.

Stage 540 is followed by stage 550 of creating a first global popularity chart, wherein identical query strings of different queries of the group of queries are enumerated, wherein—as disclosed for stage 540, different query strings may be enumerated together, e.g. if belongs to the same artist.

According to an embodiment of the invention, stage 550 includes stage 552 of ranking query strings (or groups thereof) of the first global popularity chart according to the number of geo-aware queries made using each query string (or a group thereof). By way of example, the query string (or a group of query strings) queried for the most would be ranked 1, and so forth. It is noted that the following stages may be carried out either by the actual enumeration associated with each query string (or a group of query strings), or by the ranking thereof, mutatis mutandis.

Stage 550 is followed by stage 560 of selecting query strings (or groups thereof) in response to comparison of the local and the global popularity charts of each query string (or a group of query strings) to a local popularity threshold and/or to a global popularity threshold.

In order to mathematically model local popularity of queries, $T_g$ and $T_l$, local and global popularity thresholds are defined (wherein $T_g \geq T_l$). Suppose $r_g(i)$ and $r_l(i)$ are a query strings's global and local charts ranking at week i respectively (wherein it is noted that the actual number of queries for said query string or group of query strings could be used instead of the ranking, according to other embodiments of the invention). E.g., according to an embodiment of the invention, $r_g(i)$ is the ranking of a query in the US queries popularity chart, and, $r_l(i)$ is the ranking in a local geographic area (e.g. city's)

popularity chart. Queries of emerging artists will hold that for a specific geographic area the following conditions will be fulfilled:

$r_l(i) \leq T_l$, that assures a minimum level of local popularity, meaning the artist has a stronghold of hometown audience;

$r_g(i) \geq T_g$, that assures the artist is not globally popular; and $r_l(i) \leq r_g(i)$, that requires that the local popularity ranking will be higher than the global one.

Therefore, according to an embodiment of the invention, stage 560 includes stage 562 of selecting query strings for which the local ranking in a geographic area is higher than the local popularity threshold (thus assuring a minimum level of local popularity, meaning the artist has a stronghold of hometown audience).

Likewise, according to an embodiment of the invention, stage 560 includes stage 564 of selecting query strings for which the global ranking is lower than the global popularity threshold (thus assuring that the artist is not globally popular). It is noted that, as according to an embodiment of the invention, the most popular query strings were filtered out of the group of queries in response to the list of filterable query strings during stage 520, stage 560 may not include stage 564.

Similarly, according to an embodiment of the invention, stage 560 includes stage 566 of selecting query strings for which the local ranking (in said geographic area) is higher than the global one, and conveniently, higher by at least a predetermined value (i.e. $r_l(i) \leq r_g(i) - A$).

Conveniently, stage 560 includes selecting all and only the query strings (or the groups of which) which qualified for all of stages 562, 564 and 566 (or at least those carried out), to provide a group of selected query strings (or group of selected groups of query strings).

All of the query strings (or groups thereof) selected in stage 560 are potentially associated with emerging artists, as emerging artists are characterized by high divergence values. However, even though one might expect high divergence to be a good indication for an emerging artist (in accordance with the work of Garber et al, where it was shown that high values of divergence in innovations, indicate higher probability to succeed), an attempt to detect emerging artists based directly on the divergence measurement is typically not effective enough.

E.g. in the case of rare spelling mistakes and typos, if someone mistakenly typed in something just once, and he is the only one who queried for that query string (or at least it's the only time our interception system captured that string during that week), the distribution vector of that string would be a perfect delta vector. The divergence value will be maximized, but surely this string doesn't represent an emerging artists.

Additionally, the divergence alone is usually insufficient in order to predict success, as it only considers the geographical distribution of the queries while disregards their popularity strength. The above mentioned three conditions allowed us to eliminate rare queries, while still maintaining the demand for non uniform distribution.

Detecting locally popular artists can be performed on queries from any city, or region. It is noted that, according to an embodiment of the invention, method 500 focuses on major US cities, since more emerging artists, especially rappers, are active in urban concentrations.

According to an embodiment of the invention, stage 560 is followed by stage 570 of comparing the ranking of each of the selected query strings or groups thereof (that pertains to information gathered during the first period of time) to a the ranking of the selected query strings that pertains to information gathered during a second period of time that preceded the first period of time. Conveniently, the first and the second periods of time are of equal duration (e.g. each of which lasted a week), even though that it is clear to a person who is skilled in the art that compensating for different durations could be easily achieved. Conveniently, the first period of time immediately follows the second period of time, as method 500 is carried out continually, but this is not necessarily so.

It is noted that according to different embodiments of the invention, the comparing of stage 570 may include comparing the ranking of the query strings during the first periods of time to the ranking of those query strings that were gathered at different time spans prior to the first local popularity chart (e.g. in the week prior, and a week before that).

Conveniently, for each such query string, the algorithm examines the local chart rank values up to n weeks to past, and looks for "promising" patterns. In other words, the algorithms looks for pattern in the tuple $R_j = r_l(0), r_l(1), \ldots, r_l(n)$, where rl(j) is the local popularity of the query string j weeks ago. If a desired pattern is found, the algorithm outputs the string.

The output of the algorithm is a list of query strings with high probability to belong to emerging artists.

According to some embodiments of the invention, at least one of the following patterns is looked for:

a. $R_l(1) > R_l(0)$;
b. $R_l(2) > R_l(0)$;
c. $R_l(1) > R_l(0)$ and $R_l(2) > R_l(1)$;
d. $R_l(2) > R_l(0)$ and $R_l(1) - R_l(0) > R_l(2) - R_l(1)$;
e. $R_l(2) > R_l(1)$, $R_l(1) > R_l(0)$, and $R_l(1) - R_l(0) > R_l(2) - R_l(1)$;

It is clear to a person who is skilled in the art that other patterns may be implemented as well, and that those patterns may pertain to more than three periods of time.

Figure 6:
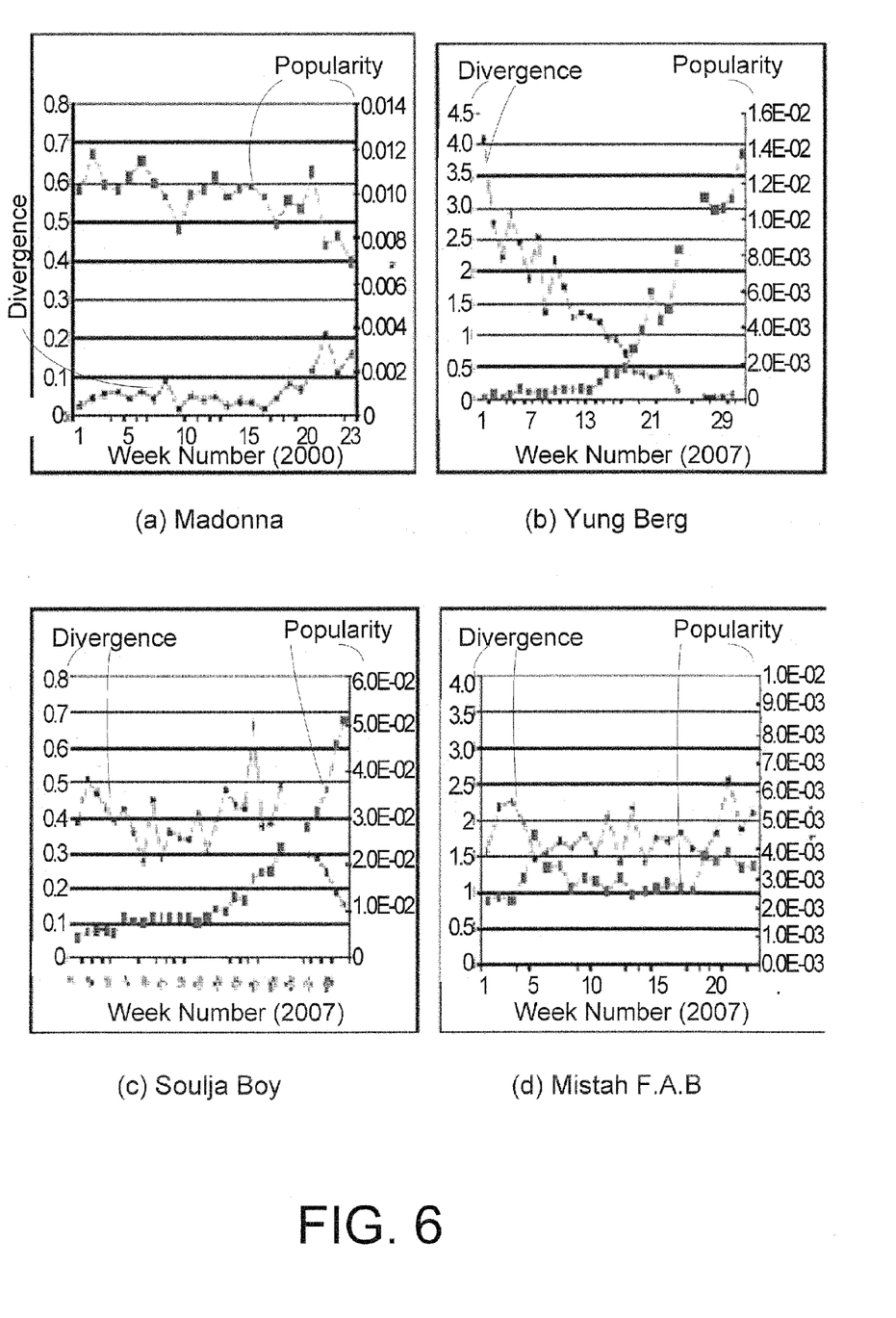
FIG. 6 illustrates popularity scorings and well as divergence of several artists, according to an embodiment of the invention.

FIG. 6 illustrates popularity scorings and well as divergence of several artists, according to an embodiment of the invention.

As to the case of an already known, well established artist: Madonna. From FIG. 6(a) we see that the popularity and divergence are relatively stable. Since this artist is very popular and well known, we see high popularity values and low divergence values reflecting a uniform distribution of audience.

Referring to the popularity and divergence trends of Yung Berg a Chicago born rapper, currently active in Los Angeles. This artist first entered the Billboard charts when his single Sexy Lady entered the 36th position on the Rhythmic Top 40 chart on the issue dated Apr. 21, 2007. This song reached the 18th position on the Billboard Hot 100 chart, but that happened only on the chart dated August 11th. In the queries popularity chart of Los Angeles this song entered the top 100 on the second week of January when he reached the 89th position. Sexy Lady gained popularity on the Hip-Hop scene of LA and by the 22nd of April (week 17), it already reached the 30th position in the local chart. From FIG. 4 we can see that this is the exact time when he started to gain popularity and audience outside of Los Angeles as reflected in the increase of the popularity and the decrease of the divergence.

Referring to DeAndre Cortez Way, Born 28th of July 1990 in Chicago, Ill., better known as Suolja Boy Tell'em moved to Atlanta when he was six years old. At age 14 he went to live with his father in Batesville, MS, where he started recording music and spreading it through the Internet. In 2004 he moved back to Atlanta and started to perform in front of live audience. Soulja Boy uploaded a video clip of his debut single Crank That to YouTube featuring an easy-to-do choreography, better known as the Crank That Dance which drew a lot of attention. With the help of his Myspace page, Soulja Boy gained increasing popularity and larger audience eventually breaking the site's record with millions of visitors. At that point he drew enough attention and interest to be signed by Interscope Records (owned by Universal Music Group) [3].

In the local popularity chart of Atlanta the string "soulja boy" entered the top 100 already in October 2006. This is almost a year before he was first noticed by Billboard when Crank That entered the Bubbling Under R&B/Hip-Hop Singles in the 23rd of June 2007! This song reached the number one on the following Billboard charts: Hot 100, Hot Rap Tracks, Hot Videoclip, Hot RingMasters and Hot Ringtones.

FIG. 6(c) depicts the artist's popularity and divergence in 2007. An interesting observation is the fact that the global popularity is increasing gradually many months before June, when he first entered the charts. Also note that the initial Divergence values, at the beginning of 2007, are lower than those of the Shop Boyz and Yung Berg, even though his breakthrough in the national level occurred only after theirs. This may be due to the artist's ability to effectively market himself using the internet, reaching larger audiences even outside his local area. However, the initial divergence is still significantly higher than the values after a national level breakthrough. Our data collection ended in August 2007, while Crank That stayed in the top of the charts many weeks afterwards, therefore the popularity increase and divergence decrease trends on FIG. 6(c) are not fully shown.

As to Mistah F.A.B; In the previous cases of Yung Berg and Soulja Boy we seen local Hip-Hop rappers rising to the level of national popularity A strong base of hometown fans is a good indication for an emerging artist, but it is not a guarantee for a national breakthrough. Mistah F.A.B. is an example of an extremely popular Bay area rapper, who at least up to the time of writing, didn't make it in the national level. Mistah F.A.B. is ranked high in the San-Francisco popularity chart throughout our data set. On the 21st of October 2006 he ranked 26 and maintained high positions along the following nine and a half months. From FIG. 6(d) we see that this artist remains with high divergence and his popularity values are relatively low and not increasing.

The present invention can be practiced by employing conventional tools, methodology and components. Accordingly, the details of such tools, component and methodology are not set forth herein in detail. In the previous descriptions, numerous specific details are set forth in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for detecting a local phenomenon, the method comprises:
   creating, by a hardware chart generator, a first local popularity chart, wherein the creating of the first local popularity chart comprises enumerating, for each geographic area of a group of sampled geographic areas, identical query strings of queries that are included in a group of queries;
   creating, by the hardware chart generator, a first global popularity chart, wherein the creating of the first global popularity chart comprises enumerating identical query strings of the queries that are included in the group of queries and are associated with any one of the geographical areas of the group of sampled geographic areas; and selecting, by a hardware processor, at least one query string in response to a scoring of the query string at the first local popularity chart that indicates that the at least one query string is locally popular and to a scoring of the query string at the first global popularity chart that indicates that the at least one query string is not globally popular;
   wherein the group of queries comprises queries which were queried during a first period of time.

2. The method according to claim 1, wherein the local phenomenon pertains to an artist, and wherein the selecting comprises selecting at least one query string that is associated with the artist.

3. The method according to claim 2, further comprising manufacturing multiple machine readable mediums, each of which stores a reproduction of media created by the artist.

4. The method according to claim 1, wherein the creating of the first local popularity chart and the creating of the first global popularity charts are carried out for the group of queries that comprises queries which were queried during the first period of time by users of at least one system for retrieving art related media.

5. The method according to claim 1, wherein the creating of the first local popularity chart and the creating of the first global popularity charts are carried out for the group of queries that comprises queries which were queried during the first period of time by users of at least one peer-to-peer network, wherein the responses to the queries of the group of queries where provided by computers of the peer-to-peer network that are located in different geographic areas of the group of sampled geographic areas.

6. The method according to claim 1, wherein the selecting is further responsive to at least one comparison of a scoring of the query string at either of the first local popularity chart and the first global popularity chart to a popularity threshold associated with that popularity chart.

7. The method according to claim 1, further comprising monitoring queries that are transmitted in a network, for assembling the group of queries, prior to the creating of the first local popularity chart and the first global popularity charts.

8. The method according to claim 1, comprising selecting a query string for which the scoring of the query string at the first local popularity chart is higher than a local popularity threshold and the scoring of the query string at the first global popularity chart is lower than a global popularity threshold.

9. The method according to claim 1, further comprising grouping different query strings which pertains to a single entity.

10. The method according to claim 1, further comprising ranking query strings of a popularity chart in response to a result of the enumeration for each query string, wherein the popularity chart is one of the first local popularity chart and the first global popularity chart.

11. The method according to claim 1, further comprising providing a list of at least one query string with high probability to belong to at least one emerging artist.

12. The method according to claim 1, further comprising comparing, for at least one of the selected query strings, a scoring of the selected query string to a scoring of the selected query string that is responsive to queries which were queried during at least one second period of time that preceded the first period of time.

13. The method according to claim 11, wherein the comparing of the scorings comprises selecting query strings for which one or more of the following conditions is true:
(a) $R_f(1) > R_f(0)$;
(b) $R_f(2) > R_f(0)$;
(c) $R_f(1) > R_f(0)$ and $R_f(2) > R_f(1)$;
(d) $R_f(2) > R_f(0)$ and $R_f(1) - R_f(0) > R_f(2) - R_f(1)$; and
(e) $R_f(2) > R_f(1)$, $R_f(1) > R_f(0)$, and $R_f(1) - R_f(0) > R_f(2) - R_f(1)$;
wherein $R_f(j)$ is the local popularity of the query string at a j-th period of time.

14. The method according to claim 1, comprising filtering out most frequently queried query strings of the group of queries.

15. The method according to claim 1, wherein the selecing of the at least one query string comprises selecting at least one query string for which the scoring of the query string at the first local popularity chart is higher by at least a predefined value than the scoring of the query string at the first global popularity chart.

16. A system for detecting a local phenomenon, the system comprises a hardware interface for receiving queries information from a system, and a hardware processor, configured to:
(a) create a first local popularity chart, wherein the creating of the first local popularity chart comprises enumerating, for each geographic area of a group of sampled geographic areas, identical query strings of queries that are included in a group of queries;
(b) create a first global popularity chart, wherein the creating of the first global popularity chart comprises enumerating identical query strings of the queries that are included in the group of and are associated with any one of the geographical areas of the group of sampled geographic areas; and
(c) select at least one query string in response to a scoring of the query string at the first local popularity chart that indicates that the at least one query string is locally popular and to a scoring of the query string at the first global popularity chart that indicates that the at least one query string is not globally popular.

17. The system according to claim 16, wherein the local phenomenon pertains to an artist, and wherein the processor is further configured to select at least one query string that is associated with the artist.

18. The system according to claim 17, further comprising a machine readable media manufacturing unit, that is adapted to receive media that is created by the artist and to manufacture multiple machine readable mediums, each of which stores a reproduction of media created by the artist.

19. The system according to claim 1, wherein the hardware processor is arranged to select at least one query string for which the scoring of the query string at the first local popularity chart is higher by at least a predefined value than the scoring of the query string at the first global popularity chart.

20. A non-transitory computer readable medium having computer-readable code embodied therein for detecting a local phenomenon, the computer readable code comprises instructions for:
(a) creating a first local popularity chart, wherein the creating of the first local popularity chart comprises enumerating, for each geographic area of a group of sampled geographic areas, identical query strings of queries that are included in a group of queries;
(b) creating a first global popularity chart, wherein the creating of the first global popularity chart comprises enumerating identical query strings of the queries that are included in the group of queries and are associated with any one of the geographical areas of the group of sampled geographic areas; and
(c) selecting at least one query string in response to a scoring of the query string at the first local popularity chart that indicates that the at least one query string is locally popular and to a scoring of the query string at the first global popularity chart that indicates that the at least one query string is not globally popular.

* * * * *